(12) United States Patent
Lund

(10) Patent No.: US 8,984,799 B2
(45) Date of Patent: Mar. 24, 2015

(54) FLEXIBLE FISHING JIG

(71) Applicant: John David Lund, Rosemount, MN (US)

(72) Inventor: John David Lund, Rosemount, MN (US)

( * ) Notice: Subject to any disclaimer, the term of this patent is extended or adjusted under 35 U.S.C. 154(b) by 267 days.

(21) Appl. No.: 13/626,861

(22) Filed: Sep. 25, 2012

(65) Prior Publication Data

US 2013/0081321 A1 Apr. 4, 2013

Related U.S. Application Data

(60) Provisional application No. 61/542,992, filed on Oct. 4, 2011.

(51) Int. Cl.
*A01K 83/06* (2006.01)
*A01K 85/00* (2006.01)
*A01K 91/04* (2006.01)

(52) U.S. Cl.
CPC ............... *A01K 85/00* (2013.01); *A01K 91/04* (2013.01)
USPC .................. 43/44.81; 43/42.24; 43/44.83

(58) Field of Classification Search
USPC ............ 43/42.15, 42.16, 42.24, 42.49, 44.83; D22/134, 144, 125, 126
See application file for complete search history.

(56) References Cited

U.S. PATENT DOCUMENTS

| | | | | |
|---|---|---|---|---|
| 3,218,752 | A * | 11/1965 | Zielaskowski | 43/44.2 |
| 3,327,423 | A * | 6/1967 | Kotis | 43/44.2 |
| 3,341,966 | A * | 9/1967 | Pippen | 43/43.15 |
| 3,858,343 | A * | 1/1975 | Goforth | 43/42.17 |
| 4,750,290 | A * | 6/1988 | Renaud | 43/42.29 |
| D421,638 | S * | 3/2000 | Yount | D22/126 |
| 6,301,822 | B1 * | 10/2001 | Zernov | 43/42.31 |
| 6,655,075 | B2 * | 12/2003 | Bohn et al. | 43/43.6 |
| 2013/0019517 | A1 * | 1/2013 | Lorentz | 43/44.81 |
| 2013/0097915 | A1 * | 4/2013 | Tamburro | 43/43.16 |

* cited by examiner

*Primary Examiner* — Christopher P Ellis

(57) ABSTRACT

A fishing jig with a flexible shank allows a minnow on the fishing jig to swim free. This natural movement of the minnow entices a predator to feed while foraging. Predators not foraging are enticed into a reaction strike with the use of various types of terminal tackle, such as colored beads, blade spinners, turbo spinners and the like. The fish hooks and the jig head can be matched to meet the fishing conditions and type of fish being targeted. For example, a heavier jig head can be used with a smaller fishing hook for fishing smaller fish in deep water.

12 Claims, 2 Drawing Sheets

FLEXIBLE FISHING JIG

CROSS-REFERENCE TO RELATED APPLICATION

This application claims the benefit of priority of U.S. provisional application No. 61/542,992, filed Oct. 2, 2011, the contents of which are herein incorporated by reference.

BACKGROUND OF THE INVENTION

The present invention relates to fishing jig and, more particularly, to a flexible fishing jig that allows natural movement of the bait minnow while attached to the fishing jig to provide a powerful attraction to a predator hunting prey for food.

When fishing with a jig and minnow, the problem is enticing a predator to forage on the minnow and/or create a reaction strike from the predator. Current fishing jigs made with a ridged steel shank do not allow for natural movement of the minnow, limits the ability to meet changing fishing conditions such as depth, current, wind, clarity, etc., the weight of the current jig head limits the type of fish targeted and incorporates an inferior fishhook which are manufactured from the steel shank. Inferior fishhooks need substantially more pressure to pierce the predator's mouth and set the hook, and impedes the ability of the hook point to snag the interior lining of the predator's mouth.

Current fishing jigs are sold as a "one size fits all" style. That is, the fishhook is sized in accordance with the weight of the jig head and allows for very little variation.

Moreover, current fishing jigs include a steel shank and are not sold with terminal tackle, such as colored beads, spinner blades, turbo spinners, swivels, clevis, and the like.

As can be seen, there is a need to revolutionize the fishing jig by addressing various issues with currently available fishing jigs; thus, improving the attraction and the strike to catch ratio when fishing.

SUMMARY OF THE INVENTION

In one aspect of the present invention, a flexible fishing jig comprises a jig head; a jig head eyelet operable to connect the jig head to fishing line; a shank formed from flexible fishing line; and a fish hook disposed on an end of the shank.

Other aspects of the flexible fishing jig comprises a jig head; a jig head eyelet operable to connect the jig head to fishing line; a shank formed from flexible fishing line; a fish hook disposed on an end of the shank; a connection point operable to connect the shank to the jig head; color beads of various size and numbers, spinner blades of various color and size, and other various types of terminal tackle These and other features, aspects and advantages of the present invention will become better understood with reference to the following drawings, description and claims.

DETAILED DESCRIPTION OF THE INVENTION

Figure 1:
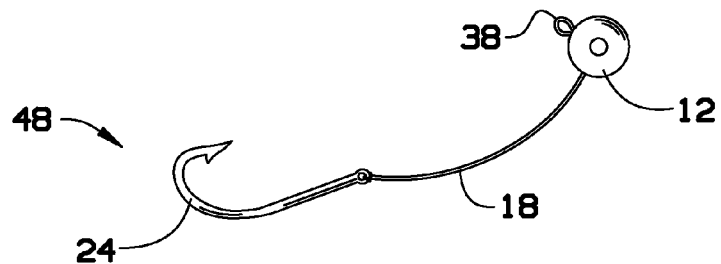
FIG. 1 is a perspective view of a flexible fishing jig according to an exemplary embodiment of the present invention demonstrates a jig head that can be of varying weights and designs, a shank made of various lengths and weights of fish line and the like and a fish hook made of various materials, sizes, and designs.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a fishing jig with a flexible shank that allows a minnow on the fishing jig to appear in a natural state. This natural movement of the minnow entices a predator to feed while foraging. Predators not foraging are enticed into a reaction strike with the use of various types of terminal tackle, such as colored beads, blade spinners, turbo spinners and the like. The fish hooks and the jig head can be matched to meet the fishing conditions and type of fish being targeted. For example, a heavier jig head can be used with a smaller fishing hook for fishing smaller fish in deep water.

The fish hooks incorporated with the flexible fishing jigs of the present invention can be high quality, improving the chances of setting the fish hook and catching the predator. The fish hooks can be laser sharpened and chemically treated to increase the ability to pierce the mouth of the predator. Thus, improving the strike to catch ratio. The fish hooks can be of various design such as, but not limited to, offset, short or long shanks, made of thin wire, or the like, to target various types of fish (such as walleye, perch, sunfish, bass or other game fish).

The fish hook and the jig head can be matched to meet the fishing conditions and type of fish being targeted. For example, most all ⅜ ounce jigs on the market come with a #1 fish hook. A #1 fish hook, however, is too large to fish for most panfish, for example. The flexible fishing jig of the present invention allows the use of a ⅜ ounce, ½ ounce, or the like, jig head and a small #8 fish hook to target panfish in deep water, windy conditions, river current, etc. The combinations are endless for the various types of fish and the fishing conditions.

As described in greater detail below, terminal tackle, such as colored beads, spinner blades, turbo spinners, clevis, swivels, and the like, can be added to the flexible fishing jig of the present invention to improve the noticeability of jig and minnow, either through sight, sound or vibration, to create a foraging and/or reaction strike from the predator/game fish.

The ability of the flexible fishing jig of the present invention to target a type of fish and meet the fishing conditions such as rivers, lakes, depth, water color, current, wind, and the like, improve the likelihood of a enticing a predator to forage on and/or creating a reaction strike. These changes made to the design of the flexible jig solve many of the limitations of the current steel shank jig and improve the chances of enticing a predator fish and improves the strike to catch ratio beyond that of the current steel shank jigs sold on the market today.

Referring now to FIG. 1, a flexible fishing jig 48 can include a jig head 12 having a jig head eyelet 38 for attachment to a fishing line (not shown). The jig head 12 can be made in various weights and sizes. The jig head 12 can act as a sinker in the water. A shank 18 can interconnect the jig head 12 with a fish hook 24. The shank 18 can be made from a flexible fishing line of various weights and lengths.

Figure 2:
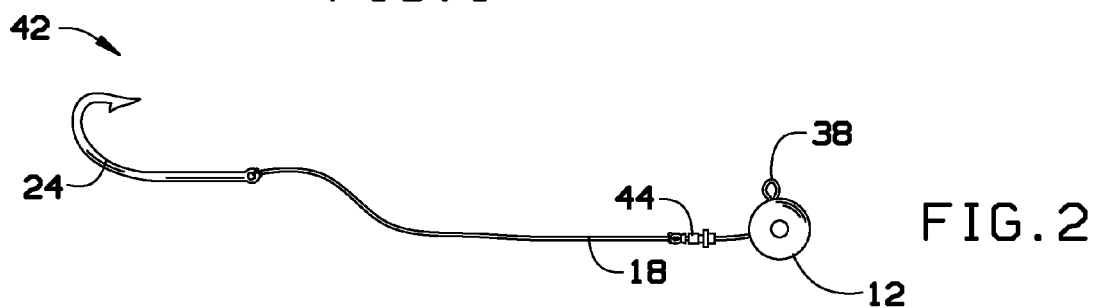
FIG. 2 is a perspective view of a flexible fishing jig with a swivel according to another exemplary embodiment of the present invention.

Referring to FIG. 2, a flexible fishing jig 42 can be designed with a swivel 44 in the shank 18, permitting the fish hook 24 to rotate relative to the jig head 12. The swivel 44 can be especially useful to allow a hook and worm (or other bait) to turn freely in the water during slow troll speeds.

Figure 3:
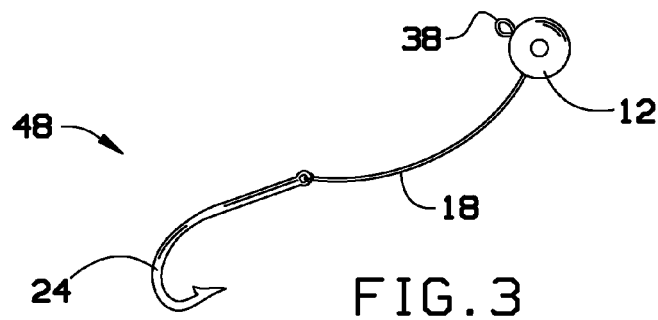
FIG. 3 is a perspective view of a flexible fishing jig with down-facing hook according to another exemplary embodiment of the present invention.

The flexible fishing jig 48 in FIG. 1 includes an up-facing hook (facing towards the jig head eyelet 38. In some embodiments, as shown in FIG. 3, the fish hook 24 can be attached in a down-facing configuration. The fish hook 24 can be positioned at various degrees of rotation between the up-facing configuration of FIG. 1 and the down-facing configuration of FIG. 3.

Figure 4:
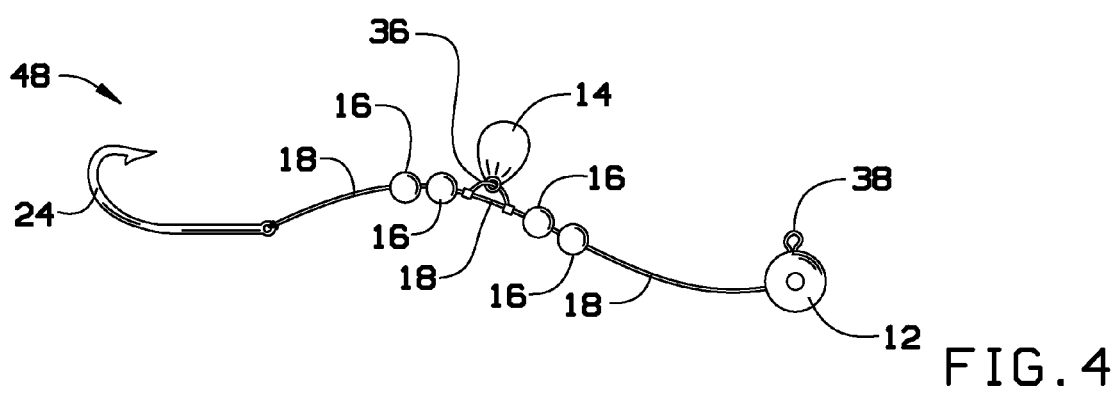
FIG. 4 is a perspective view of a flexible fishing jig having a spinner blade and other terminal tackle according to another exemplary embodiment of the present invention.

As shown in FIG. 4, the flexible fishing jig 48 can include a spinner blade 14 attached to a clevis 36 and one or more beads 16 disposed along the shank 18. The beads 16 can be made in various colors to attract the attention of predators. The clevis 36 can be made in various designs provided that it can be used to attach the spinner blade 14 to the shank 18.

Figure 5:
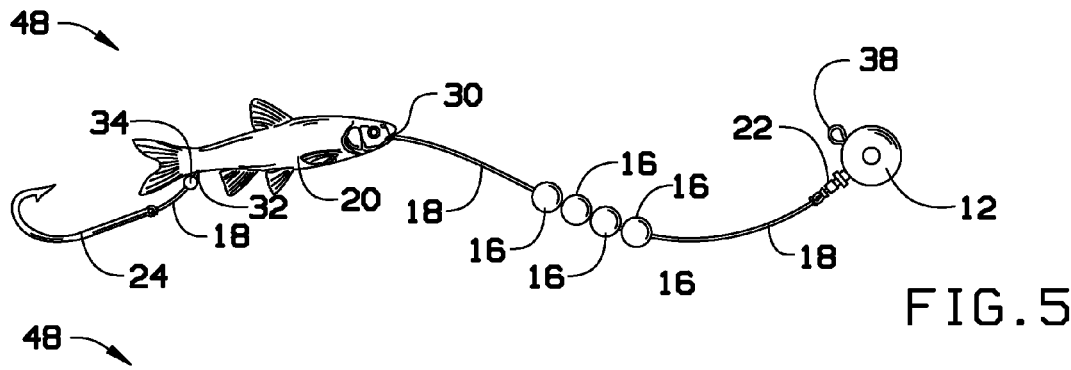
FIG. 5 is a perspective view of a flexible fishing jig having terminal tackle and live or manufactured bait according to another exemplary embodiment of the present invention.

As shown in FIG. 5, a minnow 20 can be attached to the shank 18 such that the shank 18 passes through a front end 30 and a rear end 32 of the minnow 20. A small bead 34 can be disposed between the minnow 20 and the fish hook 24 to prevent the minnow 20 from sliding down the shank 18. As described above, beads 16 can also be disposed along the shank 18. A swivel or non-swivel connection point 22 can be provided to connect the shank 18 to the jig head 12. Various styles of connection points 22 can be used.

Figure 6:
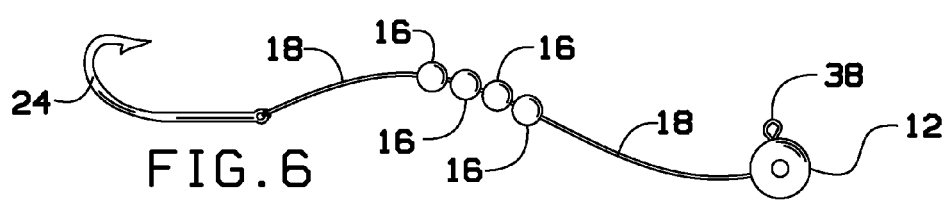
FIG. 6 is a perspective view of a flexible fishing jig having beads varing in size, color, number and placement on the shank according to another exemplary embodiment of the present invention.
Figure 7:
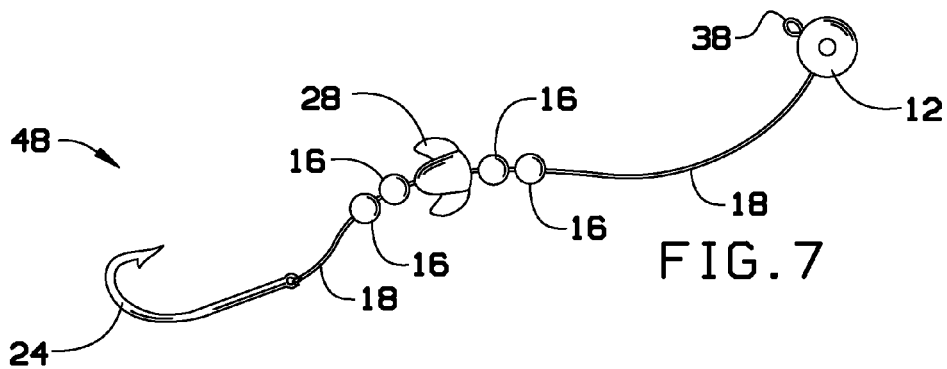
FIG. 7 is a perspective view of a flexible fishing jig having a turbo spinner and beads according to another exemplary embodiment of the present invention.

Referring to FIGS. 6 and 7, variations in the design of the flexible fishing jig 48 are shown. A turbo spinner 28 can be placed along the shank 18, as well as beads 16 of various colors, sizes and shapes.

Figure 8:
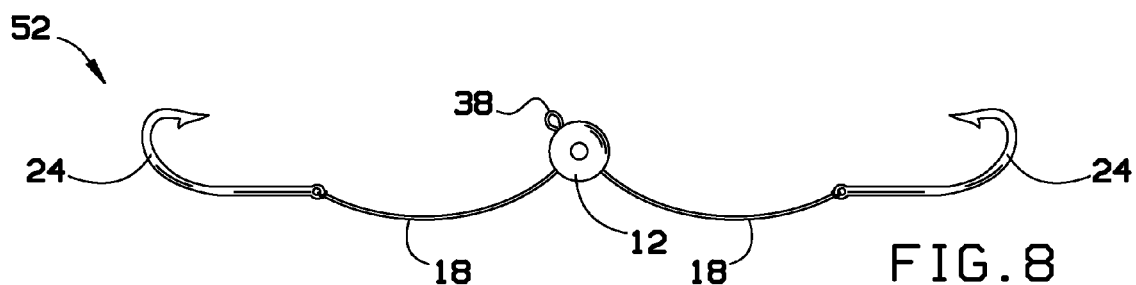
FIG. 8 is a perspective view of a flexible fishing jig having multiple hooks according to another exemplary embodiment of the present invention.

As shown in FIG. 8, a multi-hook flexible fishing jig 52 can include multiple shanks 18 and fish hooks 24 attached to a single jig head 12. While two fish hooks 24 are shown, various numbers of fish hooks can be used, depending on application and local fishing regulations. While FIG. 8 shows the shanks 18 for each fish hook 24 being the same length, various lengths of shanks 18 may be used to offset the distance the fish hook 24 is from the jig head 12.

It should be understood, of course, that the foregoing relates to exemplary embodiments of the invention and that modifications may be made without departing from the spirit and scope of the invention as set forth in the following claims.

What is claimed is:

1. A flexible fishing jig comprising:
   a jig head;
   a jig head eyelet operable to connect the jig head to fishing line;
   a shank formed from flexible fishing line; and
   a fish hook disposed on an end of the shank.

2. The flexible fishing jig of claim 1, further comprising one or more beads disposed along the shank.

3. The flexible fishing jig of claim 1, further comprising a connection point operable to connect the shank to the jig head.

4. The flexible fishing jig of claim 3, further comprising a stop bead disposed along the shank, adjacent to the fish hook, the stop bead operable to prevent a minnow disposed along the shank from sliding over the fish hook.

5. The flexible fishing jig of claim 1, further comprising a spinning blade attached to the shank.

6. The flexible fishing jig of claim 1, further comprising a spinner attached to the shank.

7. The flexible fishing jig of claim 1, further comprising at least a second shank extending from the jig head, the second shank formed from a flexible fishing line, the second shank having a second hook disposed on an end thereof.

8. The flexible fishing jig of claim 1, further comprising a swivel disposed in the shank.

9. A flexible fishing jig comprising:
   a jig head;
   a jig head eyelet operable to connect the jig head to fishing line;
   a shank formed from flexible fishing line;
   a fish hook disposed on an end of the shank;
   a connection point operable to connect the shank to the jig head;
   a stop bead disposed along the shank, adjacent to the fish hook, the stop bead operable to prevent a minnow disposed along the shank from sliding over the fish hook; and
   one or more beads disposed along the shank.

10. The flexible fishing jig of claim 9, further comprising a spinning blade attached to the shank.

11. The flexible fishing jig of claim 9, further comprising a spinner attached to the shank.

12. The flexible fishing jig of claim 9, wherein the connection point is a swivel connection point.

* * * * *